United States Patent
Isaac et al.

(10) Patent No.: US 8,204,463 B2
(45) Date of Patent: Jun. 19, 2012

(54) METHOD FOR ANTENNA VERIFICATION

(75) Inventors: Paul Isaac, Victoria (AU); Xinhua Wang, Victoria (AU)

(73) Assignee: NEC Corporation, Tokyo (JP)

(*) Notice: Subject to any disclaimer, the term of this patent is extended or adjusted under 35 U.S.C. 154(b) by 912 days.

(21) Appl. No.: 11/884,687

(22) PCT Filed: Feb. 20, 2006

(86) PCT No.: PCT/JP2006/303508
§ 371 (c)(1),
(2), (4) Date: Dec. 13, 2007

(87) PCT Pub. No.: WO2006/088252
PCT Pub. Date: Aug. 24, 2006

(65) Prior Publication Data
US 2008/0153446 A1   Jun. 26, 2008

(30) Foreign Application Priority Data

Feb. 21, 2005  (AU) .............................. 2005900791
Feb. 13, 2006  (AU) .............................. 2006200589

(51) Int. Cl.
*H04B 17/00* (2006.01)
(52) U.S. Cl. .................... 455/226.1; 455/67.11; 375/229
(58) Field of Classification Search .......... 375/229–336, 375/346–351; 455/101, 276.1, 277.1, 226.1–226.4, 455/67.11–67.16, 296
See application file for complete search history.

(56) References Cited

U.S. PATENT DOCUMENTS

| | | | |
|---|---|---|---|
| 6,611,675 B1 | 8/2003 | Salonen et al. | |
| 6,816,558 B2* | 11/2004 | Piirainen et al. | 375/231 |
| 2003/0185165 A1* | 10/2003 | Ishii et al. | 370/317 |
| 2004/0252778 A1 | 12/2004 | Nilsson | |
| 2005/0025225 A1* | 2/2005 | Niederholz et al. | 375/148 |
| 2006/0034352 A1* | 2/2006 | Sampath et al. | 375/148 |
| 2006/0093056 A1* | 5/2006 | Kaasila et al. | 375/267 |
| 2006/0262840 A1* | 11/2006 | Wang et al. | 375/221 |
| 2007/0053416 A1* | 3/2007 | Li et al. | 375/147 |
| 2007/0071071 A1* | 3/2007 | Li et al. | 375/147 |
| 2009/0227208 A1* | 9/2009 | Shinoda et al. | 455/67.11 |
| 2011/0103453 A1* | 5/2011 | Primo et al. | 375/229 |

FOREIGN PATENT DOCUMENTS

JP  2003-008552  1/2003

OTHER PUBLICATIONS

Seeger A., et al; Antenna Weight Verification for Closed Loop Transmit Diversity, Globecom 2003, IEEE Global Telecommunications Conference, Conference Proceedings, San Francisco, Dec. 1-5, 2003.
Japanese Official Action dated Jan. 31, 2012 from related application JP 2007-539388.

* cited by examiner

*Primary Examiner* — Lana N Le
(74) *Attorney, Agent, or Firm* — Scully, Scott, Murphy & Presser, P.C.

(57) ABSTRACT

A method of enabling a communications receiver to verify an antenna weight previously signalled by the communications receiver to a base station, the method including the steps of; equalizing (14) a channel estimate of a dedicated pilot channel by the complex conjugate of a channel estimate of a common pilot channel to form an estimate of the transmission weight used by the base station; and for each transmission slot, combining (20) a component of the transmission weight estimates for current and previous slots to form an optimised transmission weight estimate.

5 Claims, 3 Drawing Sheets

F I G. 1
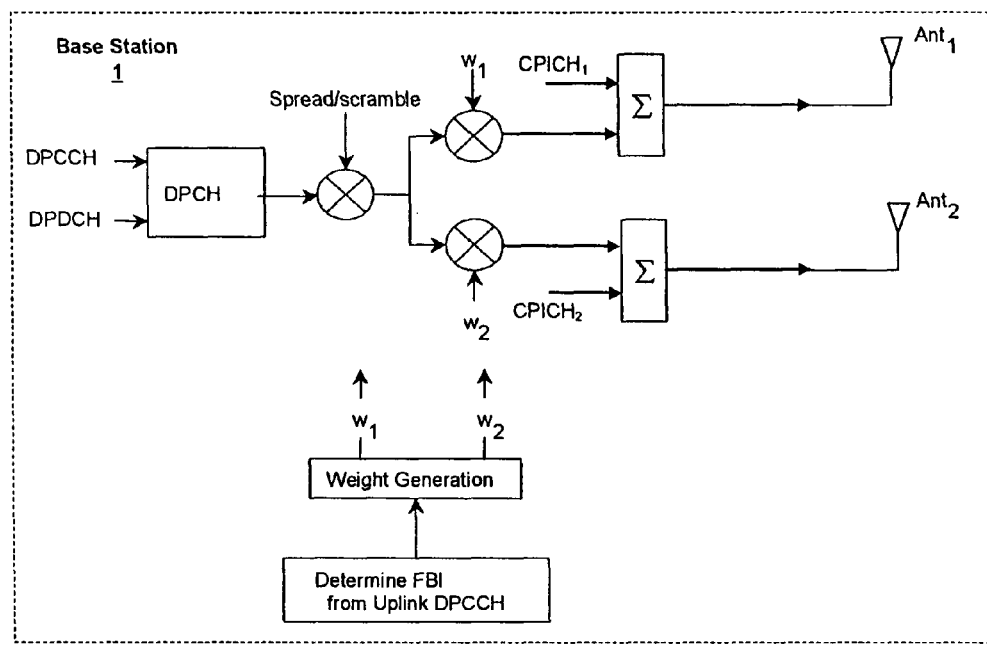

METHOD FOR ANTENNA VERIFICATION

The present invention relates generally to wireless telecommunications systems, and in particular to methods of verifying an antenna weight previously signalled by a communications receiver to a base station within wireless telecommunications systems.

The present invention has a particular application in systems conforming to the third generation wide band code division/multiple access (W-CDMA) systems, and it will be convenient to describe the invention in relation to that exemplary, but non limiting, application. With this in mind, the 3GPP term "User Equipment" will be used to refer to the communications receiver throughout the description of the preferred embodiments. However, the present invention should not be considered to be limited to use with communications receivers operating according to standards defined by the 3GPP.

Current W-CDMA standards define the use of closed loop, feed back mode transmitter diversity. FIG. 1 shows a general W-CDMA transmitter structure to support closed loop mode transmit diversity for dedicated physical channel (DPCH) transmission. The DPCH is spread and scrambled. The spread complex valued signals are then fed to two transmitter antenna branches $Ant_1$ and $Ant_2$, and weighted with antenna-specific weight factors $w_1$ and $w_2$ respectively. The weight factors are complex values and correspond to the phase-offset of the two antennas paths determined by user equipment 2 and signalled to base station 1 via an uplink dedicated physical control channel (DPCCH). The uplink DPCCH is used to carry control information consisting of known pilot bits to support channel estimation, downlink power-control, feedback information (FBI) and an optional transport format combination indicator. FIG. 2 shows the frame structure of an uplink DPCCH. Each radio frame has a length of 10 ms and is split into 15 slots, each of length 2560 chips, corresponding to one power-control period.

The user equipment 2 uses the CPICH to separately estimate channels seen from each antenna $Ant_1$ and $Ant_2$. Once every slot, the user equipment 2 chooses an optimum weight from amongst a mode specific transmit weight set. The optimum weight is selected so that, when applied at the base station 1, the received power is maximised at the user equipment 2. The user equipment 2 then feeds back to the base station 1 FBI bits which informs the base station 1 of which power or phase settings should be used.

The user equipment 2 will typically wish to utilise CPICH channels in channel estimation due to the higher transmission power resulting in a more reliable channel estimation. In order to properly combine the channel estimates corresponding to $CPICH_1$ and $CPICH_2$, the user equipment 2 must know the transmission weight that was used by the base station 1. However, the feedback channel that is used to transmit the FBI bits from the user equipment 2 to the base station 1, and which are employed by the base station 1 to steer that phase or amplitude shift of the antennas $Ant_1$ and $Ant_2$, are subject to error. Accordingly, the base station 1 may not always transmit the DPCH using the optimal phase-offset or amplitude-offset determined by the user equipment 2. Without the knowledge of the actual phase-offset or amplitude-offset used by the base station 1, the user equipment 2 will perform an incorrect channel estimate, resulting in a degradation of the user equipment performance.

Techniques exist to enable the user equipment 2 to estimate the antenna specific weight factors $w_1$ and $w_2$. However, existing techniques are invariably prone to error and unreliable and/or require expensive and power consuming computational resources. There currently exists a need to provide a method of enabling user equipment to verify an antenna weight previously signalled by the user equipment to a base station that is simple, efficient and minimises the resources required to carry out the method by user equipment.

With this in mind, one aspect of the present invention provides a method of enabling a communications receiver to verify an antenna weight previously signalled by the communications receiver to a base station, the method including the steps of;

equalising a channel estimate of a dedicated pilot channel by the complex conjugate of a channel estimate of a common pilot channel to form an estimate of the transmission weight used by the base station; and for each transmission slot, combining a component of the transmission weight estimates for current and previous slots to form an optimised transmission weight estimate.

The transmission weight may include any one or more of a phase-offset, amplitude-offset or like quantity.

The base station may include two or more antennas for transmit diversity.

The communications receiver and base station may form part of a W-CDMA or like wireless communication system.

Preferably, the component of the transmission weight estimates that is combined may depend upon an uplink slot number of the last feedback information to effect the current transmission weight.

The method may further include the step of;

delaying the equalization step; and forming the optimised transmission weight estimate from a component of the transmission weight estimates for current, previous and future slots.

In embodiments of the invention in which the communications receiver and base station form part of the W-CDMA system, the in-phase component of the transmission weight estimates are combined when the uplink slot number of the last feedback information bit is an odd number.

In embodiments of the invention in which the communications receiver and base station form part of the W-CDMA system, the quadrature phase component of the transmission weight estimates are combined when the uplink slot number of the last feedback information bit is an even number or zero.

Another aspect of the invention provides a communications receiver adapted for communication with a base station, including processing means for enabling the communications receiver to carry out the above described method.

The following description refers in more detail to the various features of the present invention. To facilitate an understanding of the invention, reference is made in the description to the accompanying drawings where the method of enabling user equipment to verify an antenna weight is illustrated in a preferred embodiment. It is to be understood that the invention is not however limited to the preferred embodiment illustrated.

In the drawings:

FIG. 1 is a schematic diagram of an illustrative base station and user equipment forming part of a W-CDMA communication system;

In order to assist in the clarity of the following description, the phase-offset by the base station 1 shall be referred to as the "true phase-offset", while the phase-offset that the user equipment 2 signals to the base station 1 shall be referred to as the "intended phase-offset". It will be appreciated that whilst phase-offset is used in this exemplary embodiment as an example of an antenna weight set by the base station 1, in other embodiments of the invention the antenna weight may be an amplitude-offset or other quantity.

The true phase-offset is the same as the intended phase offset when the base station 1 receives both feed back information (FBI) bits without error. However, when one or more of the two FBI bits are in error the true phase-offset will be different from the intended phase-offset. During soft handover, base stations that receive FBI bits in error will set a different phase-offset to other base stations, so that antenna verification procedure should be applied to each radio link separately.

The user equipment 2 estimates which possible phase-offset value has the highest probability of being the true phase-offset. To assist in the clarity of the following explanation, the phase-offset selected by the user equipment 2 shall be referred to as the "hard phase-offset estimate". The estimates of the channels seen from antenna $Ant_2$ are rotated by the hard phase-offset estimate before the DPCH symbols are equalized.

Figure 3:
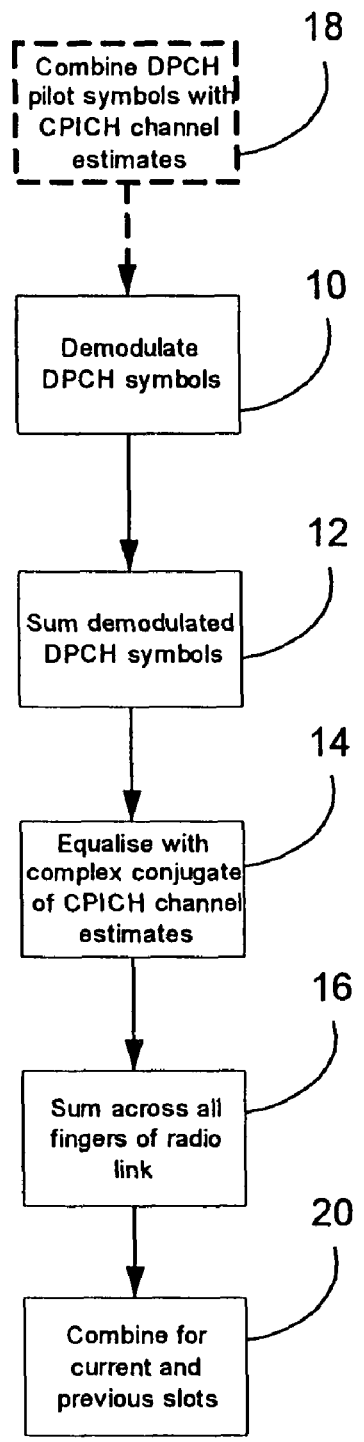
FIG. 3 is a flow chart depicting steps performed by the user equipment of FIG. 1 in order to verify an antenna weight previously signalled by the user equipment to the base station of FIG. 1.

As can be seen in FIG. 3, the user equipment 2, at step 10, demodulates the DPCH pilot symbols with the pilot symbol pattern for antenna $Ant_2$. At step 12, and the sum of the demodulated pilot signals is determined. This sum is a DPCH based channel estimate for the antenna $Ant_2$ channel that includes the true phase-offset. The antenna Anti component of the DPCH is not present in this channel estimate because the pilot symbol patterns for antenna $Ant_1$ and antenna $Ant_2$ are orthogonal.

At step 14, the user equipment 2 acts to equalise the DPCH based channel estimate for the antenna $Ant_2$ channel with the complex conjugate of the CPICH channel estimate for antenna $Ant_2$. This acts to remove the phase rotation of that channel.

At step 16, the result is summed across all fingers allocated to the same radio link to form an estimate of the true phase offset. In the following description, this estimate shall be referred to as the "soft phase-offset estimate".

Alternatively, the DPCH pilot symbols and the CPICH channel estimates can be combined (see step 18) across all fingers allocated to the same radio link, and these combined symbols used in the demodulation and equalisation steps 10-16 to form the soft phase estimate for the radio link. Which method is used will depend upon the implementation of the rake receiver (not shown) used in the user equipment 2.

The soft phase estimates for each finger "f" of a same radio link, as calculated by the user equipment 2 in steps 10-14 is given by the following equation:

$$W_f = \left[ \sum_{i=0}^{N_{pilot}-1} (R_{i,f} \cdot X2_i^*) \right] \cdot C_{2,f}^*$$

Where:
$R_{i,f}$ represents the received DPCH pilot symbols on finger 'f'
$X2_i^*$ represents the complex conjugate of the antenna 2 pilot symbol pattern $N_{pilot}$ is the number of pilot symbols in the slot $C_{2,f}$ is the complex conjugate of the antenna 2 channel estimate for finger 'f'
$W_f$ is the soft phase-offset estimate for finger 'f'

The soft phase-offset estimates summed in step 16 across all valid fingers allocated to the same radio link as given by the equation:

$$W = \sum_f W_f$$

The user equipment 2 uses the soft phase estimates calculated in steps 10-16 in order to derive the hard phase-offset estimate. Whilst other algorithms have been proposed in this area, none have been found to use the soft phase-offset estimates as efficiently or produce hard phase-offset estimates with as low an error rate.

At each slot, either the in-phase or the quadrature component of the true phase-offset has the same value for the current slot and a previous slot. At step 20, the user equipment 2 acts to combine this component of the current and previous soft phase-offset estimates in order to decrease the error rate of the hard phase-offset estimate.

The component of the soft phase-offset estimates that is combined depends upon the uplink slot number of the last FBI bit to effect the current true phase-offset. The 3 different possible cases in W-CDMA systems are: even uplink slot numbers except for slot numbers 0, odd uplink slot numbers and uplink slot number 0. The user equipment 2 is adapted to determine the uplink slot number of the last FBI bit to effect the current slots true phase-offset using the current slot downlink number and the closed loop timing mode (J+1 or J+2).

Table 1 shows which component of the true phase offset is combined according to the uplink slot number of the last FBI bit to effect the current transmission weight in a W-CDMA system.

Hard Phase-Offset Estimate Based on Soft
Phase-Offset Estimates Not Using the Next Slot

TABLE 1

| Uplink Slot Number | | |
|---|---|---|
| Slot 2, 4, 6, 8, 10, 12 or 14 | $W_I = W_I^i$ | $W_Q = W_Q^i + W_Q^{i-1}$ |
| Slot 1, 3, 5, 7, 9, 11 or 13 | $W_I = W_I^i + W_I^{i-1}$ | $W_Q = W_Q^i$ |
| Slot 0 | $W_I = W_I^i$ | $W_Q = W_Q^i + W_Q^{i-1} + W_Q^{i-2}$ |

In table 1, $W_I^i$ and $W_Q^i$ are the in-phase and quadrature component of W for the current slot,
$W_I^{i-1}$ and $W_Q^{i-2}$ are the in-phase and quadrature component of W for the previous slot, and
$W_I^{i-2}$ and $W_Q^{i-2}$ are the in-phase and quadrature component of W for the slot before the previous slot.

For odd slot numbers, the in-phase component of the soft phase-offset estimate for the current slot and the previous slot are combined since it is known that the in-phase component of the true phase-offset must be the same for these slots.

Once per frame there are three slots in a row with the same quadrature component of the true phase-offset. This occurs because of the two even numbered slots in a row, i.e. slot 14 followed by slot 0 of the next frame. Extra benefit is gained from combining the quadrature component of all three soft phase-offset estimates when the current slot number is 0.

If the equalisation of the data symbol with the channel estimate can be delayed in the base station 1, the soft phase-offset estimate of a future slot can also be used. This will further decrease the error rate of the hard phase-offset estimate.

Table 2 shows those components of the current, previous and future slots that are combined in such a case.

Hard Phase-Offset Estimate Based on Soft
Phase-Offset Estimates Using the Next Slot

TABLE 2

| Uplink Slot Number | | |
|---|---|---|
| Slot 2, 4, 6, 8, 10, 12 or 14 | $W_I = W_I^{i+1} + W_I^i$ | $W_Q = W_Q^i + W_Q^{i-1}$ |
| Slot 1, 3, 5, 7, 9, 11 or 13 | $W_I = W_I^i + W_I^{i-1}$ | $W_Q = W_Q^{i+1} + W_Q^i$ |
| Slot 0 | $W_I = W_I^{i+1} + W_I^i$ | $W_Q = W_Q^i + W_Q^{i-1} + W_Q^{i-2}$ |

In table 2, $W_I^{i+1}$ and $W_Q^{i+1}$ are the in-phase and quadrature component of W for the next slot.

From the combined soft phase-offset estimate thus calculated, a corresponding hard phase-offset estimate, as shown in table 3, is determined by the user equipment 2.

TABLE 3

| Combined soft phase-offset estimate | Hard phase-offset estimate |
|---|---|
| $W_I \geq 0$ and $W_Q \geq 0$ | $\pi/4$ |
| $W_I < 0$ and $W_Q \geq 0$ | $3\pi/4$ |
| $W_I < 0$ and $W_Q < 0$ | $5\pi/4$ |
| $W_I \geq 0$ and $W_Q < 0$ | $7\pi/4$ |

It will be appreciated from the foregoing that the above described method can be extended to take into account the downlink signal quality, the assume FBI error rate on uplink, or any other relevant information. For example, the probability of the intended phase-offset is higher than other phase-offsets. Moreover, the variance of the soft phase-offset estimate is related to the downlink signal quality, so less weight may be given to the soft phase estimates when the downlink signal quality is poor, and more weight given when the downlink signal quality is high. Accordingly, the regions may be changed to reflect the a priori probabilities of each of the phase-offsets and the estimated variance of the soft phase-offset estimates.

Figure 2:
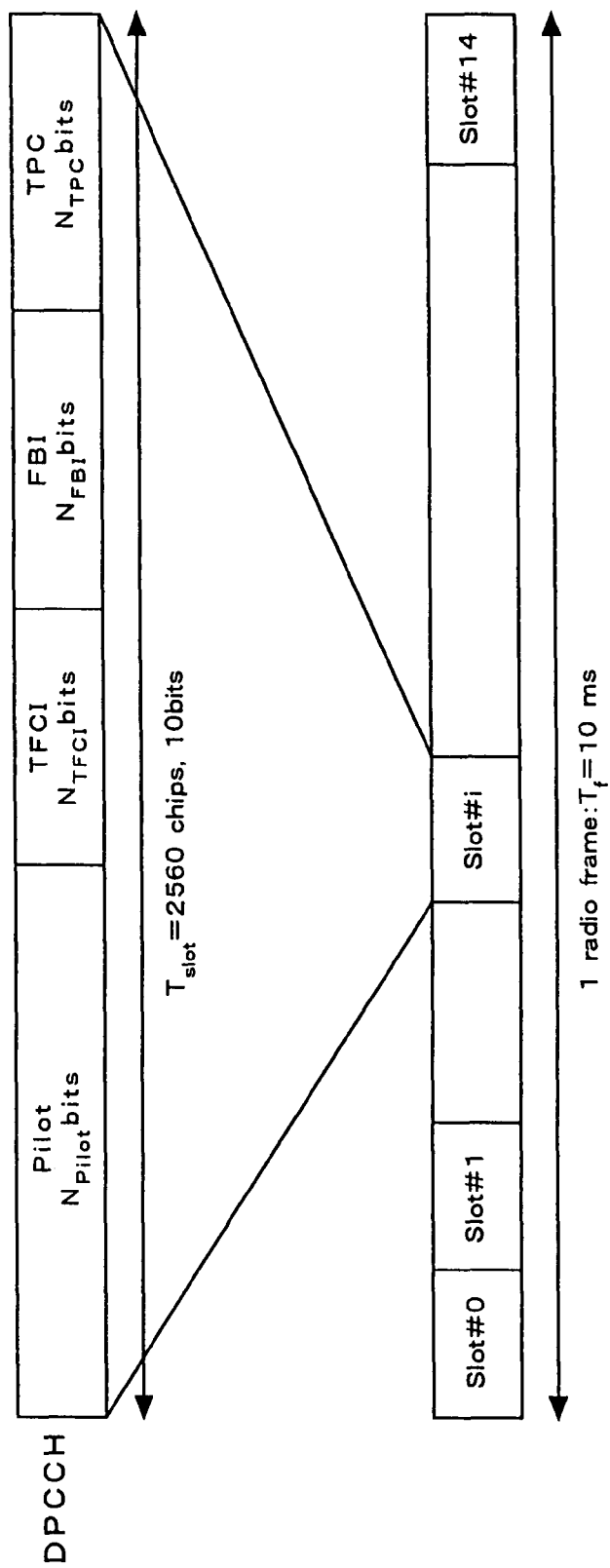
FIG. 2 is a schematic diagram of an uplink dedicated control channel in which feedback information is transmitted each slot from the user equipment to the base station of FIG. 1.

Antenna verification cannot be used for closed loop mode 2 (as defined by current 3GPP standards), because the DPCH pilot patterns on the two antennas $Ant_1$ and $Ant_2$ are not orthogonal. However, the above described method could well be extended to closed loop mode 2 if the DPCH pilot patterns were changed to make them orthogonal. Current 3GPP specifications described two approaches for deriving a hard phase-offset estimate from soft phase-offset estimates. The first 3GPP method describes using a four-hypothesis test per slot, with each hypothesis based on one of the four possible phase-offset values (the four values indicated in table 3). This method does not however use the previous slot's soft phase-offset estimate even though the previous and the current slot's true phase-offset must be in the same half-plane. The method described in the present specification, in the context of the exemplary embodiment shown in FIGS. 1-3, also uses a four-hypothesis test per slot, but provides a significant improvement due to the soft phase estimates of previous slots being used to improve the reliability of the hard phase-offset estimate.

The second 3GPP method described in current 3GPP standard uses a two-hypothesis test per slot, based on two possible received FBI values for the last FBI bit that effects the current slots true phase-offset. In this context, the "received FBI value" is the FBI value detected at the base station 1 and used to determine the true phase-offset. The best estimate by the user equipment 2 of the FBI value received by base station 1 shall be referred to as the "FBI value estimate". The FBI value of a particular downlink slot shall correspond to the last received FBI value that effects the slots true phase-offset, even though the FBI value was sent on an uplink 1 or 2 slots beforehand. According to current 3GPP standards in relation to the second 3GPP method, the FBI value estimates from the last even and last odd numbered uplink slot determine the hard phase-offset estimate. It will be noted that if the estimated FBI value in this method is incorrect, and the estimated phase-offset will be incorrect for at least two slots in a row. The current 3GPP method does not use both the current and previous slots soft phase-offset estimate for the previous slots FBI value estimate, even though the true phase-offset of both slots depends on the previous slots received FBI value.

The method described in the present specification is also applicable within the context of a two-hypothesis test per slot method. The current slots soft phase estimate can accordingly be used to revise and improve the reliability of the previous slots FBI value estimate, thus providing a significant improvement over the existing second 3GPP method.

The antenna weight verification method described in the present specification is applicable to closed loop transmit diversity systems, or other communications systems, where a component of the phase-offset or amplitude-offset between antennas, or other quantity, is maintained over multiple periods. Components of the soft estimates that are maintained over multiple periods are soft combined to obtain a more reliable estimate of the phase-offset, amplitude-offset or other quantity. The invention has been described in the present specification in the context of antenna verification for closed loop mode 1 transmit diversity in a 3GPP W-CDMA system including base station and user equipment, however it will be appreciated that this is but one exemplary application of the invention and that the invention is also applicable to other technologies and systems including different types of communication receivers and network apparatus.

The invention claimed is:

1. A method of enabling a communications receiver to verify an antenna weight previously signalled by the communications receiver to a base station, the method including the steps of:
   equalising a channel estimate of a dedicated pilot channel by the complex conjugate of a channel estimate of a common pilot channel to form an estimate of the transmission weight used by the base station;
   for each transmission slot, combining a component of the transmission weight estimates for current and previous slots to form an optimised transmission weight estimate;
   delaying an equalization of data symbol with the channel estimate in the base station; and
   forming the optimised transmission weight estimate from a component of the transmission weight estimates for current, previous and future slots, wherein the communications receiver and base station form part of a W-CDMA wireless communication system, and the component of the transmission weight estimates that is combined depends upon an uplink slot number of the last feedback information bit to effect the current transmission weight.

2. A method according to claim 1, wherein the transmission weight includes any one or more of a phase-offset or amplitude-offset.

3. A method according to claim 1, wherein the base station includes two or more antennas for transmit diversity.

4. A method according to claim 1, wherein the in-phase component of the transmission weight estimates are combined when the uplink slot number of the last feedback information bit is an odd number.

5. A method according to claim 1, wherein the quadrature phase component of the transmission weight estimates are combined when the uplink slot number of the last feedback information bit is an even number or zero.

* * * * *